Jan. 11, 1966 — H. S. BUDNEY ETAL — 3,228,266
TILTING ROTARY TABLE
Filed Sept. 19, 1962 — 5 Sheets-Sheet 1

INVENTORS
HENRY S. BUDNEY
MICHAEL P. BUDNEY
THADDEUS W. BUDNEY
MATTHEW F. SACZAWA

BY
ATTORNEY

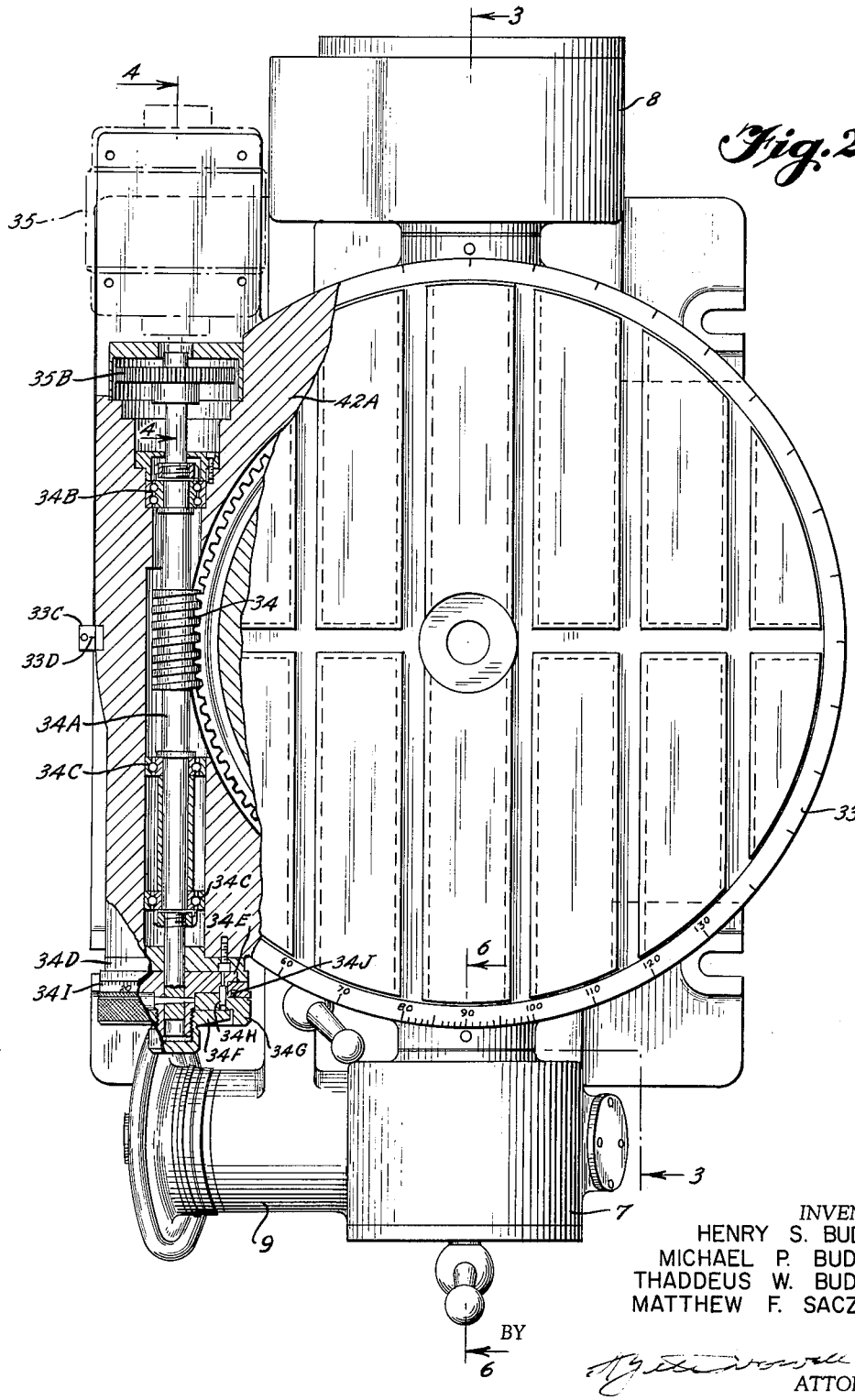

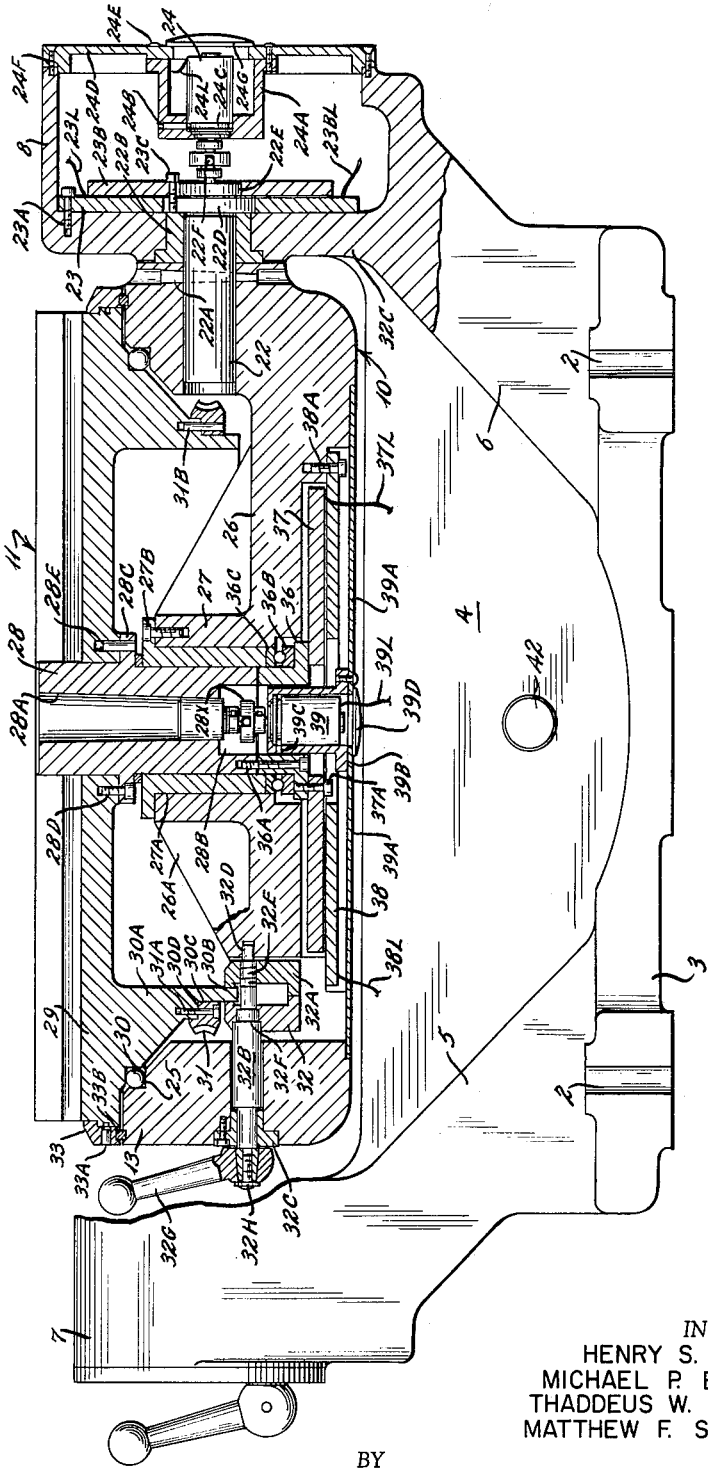

Jan. 11, 1966 H. S. BUDNEY ETAL 3,228,266
TILTING ROTARY TABLE
Filed Sept. 19, 1962 5 Sheets-Sheet 4

INVENTOR
HENRY S. BUDNEY
MICHAEL P. BUDNEY
THADDEUS W. BUDNEY
MATTHEW F. SACZAWA

BY

ATTORNEY

Jan. 11, 1966 H. S. BUDNEY ETAL 3,228,266
TILTING ROTARY TABLE
Filed Sept. 19, 1962 5 Sheets-Sheet 5
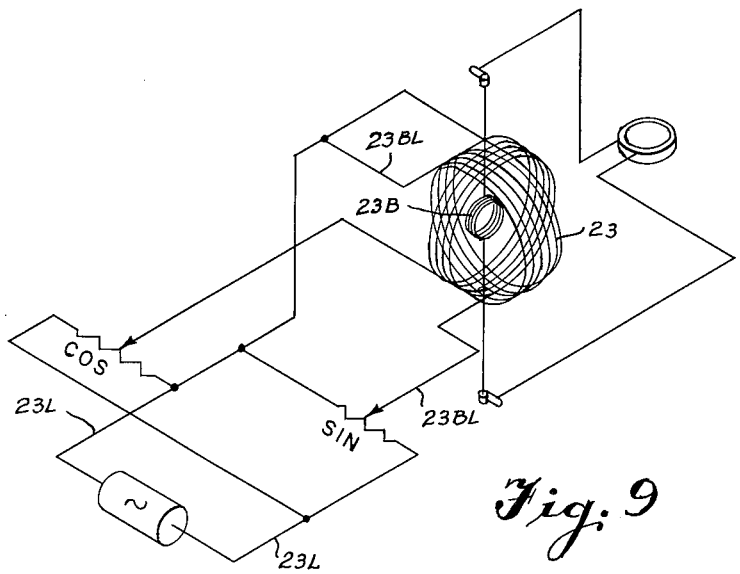
*Fig. 9*
*Fig. 10*
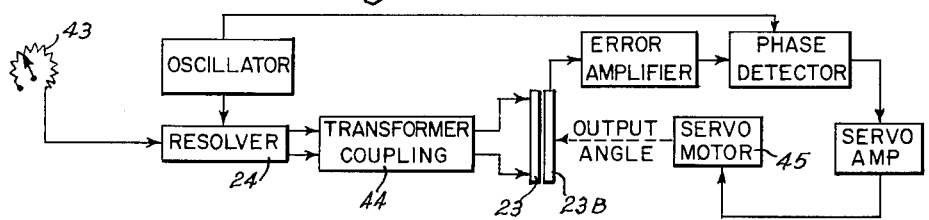
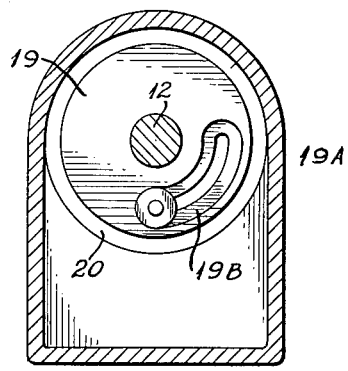
*Fig. 8*
INVENTORS
HENRY S. BUDNEY
MICHAEL P. BUDNEY
THADDEUS W. BUDNEY
MATTHEW F. SACZAWA
BY
ATTORNEY

United States Patent Office

3,228,266
Patented Jan. 11, 1966

3,228,266
TILTING ROTARY TABLE
Henry S. Budney, Newington, Michael P. Budney, Berlin, Thaddeus W. Budney, Newington, and Matthew F. Saczawa, Wethersfield, Conn., assignors to Atlantic Machine Tool Works, Inc., Newington, Conn.
Filed Sept. 19, 1962, Ser. No. 224,774
9 Claims. (Cl. 77—64)

The present invention relates to a tiltable rotary table in which the angle of tilt and the angle of rotation of the table are accurately predetermined by an electronic measuring device known commercially as Inductosyn.

In the machine tool operation it is essential to have accurate means to position the work particularly with relation to the angle of tilt and the angle of rotation of a rotary table. Heretofore the means used for this positioning of the work have been dependent upon optical means and/or mechanical means requiring accurate observation by the operator and such accurate observation by the eyes has been difficult due to lighting conditions and the age and condition of the eyes of the operator with resulting danger of mistakes, and the mechanical means was inaccurate due to lost motion in the parts and/or strains in the parts. Further, the strains frequently caused changes in adjustment due to vibration during machining operations.

An object of the invention is to provide a tiltable rotary table which overcomes these problems of the prior art structures.

An object of the present invention is to provide a tiltable rotary table work suport which is accurately positioned and the final determination is based on electronic rather than on optical measurements.

A further object is to provide a tiltable rotary table in which the angle of tilt can be accurately adjusted from zero to ninety degrees.

Another object is to provide an electronic indicating measurement based on the coupling effect of wound rotors and stators to indicate an accurate predetermined position of the parts.

Figure 1:
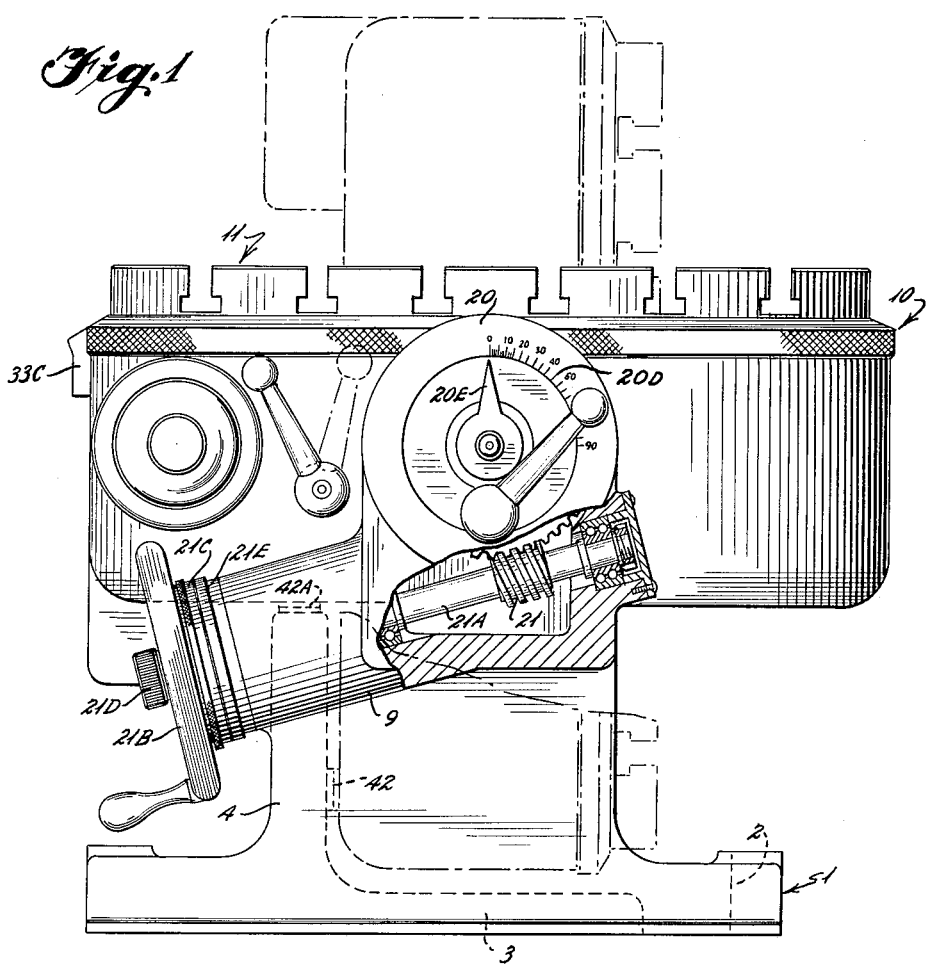
Figure 7:
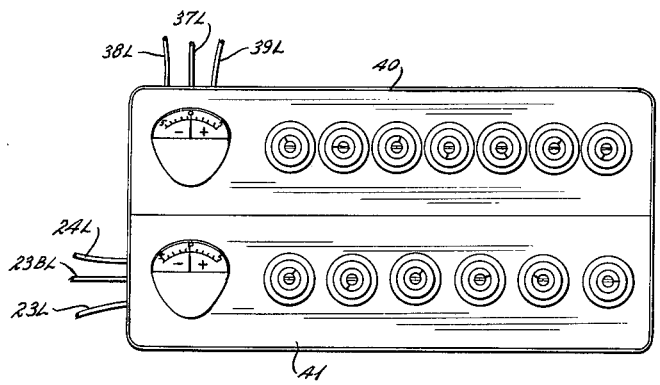
Figure 4:
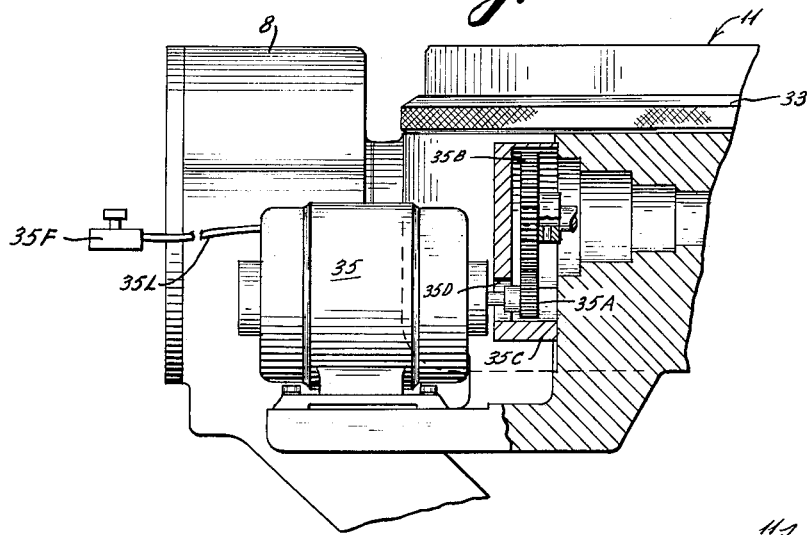
Figure 5:
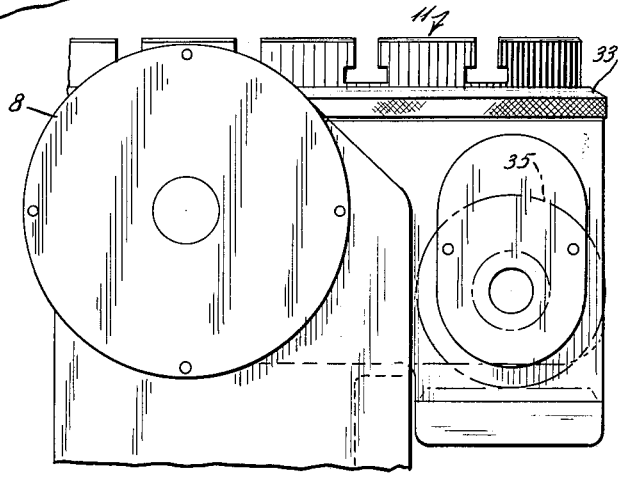
Figure 6:
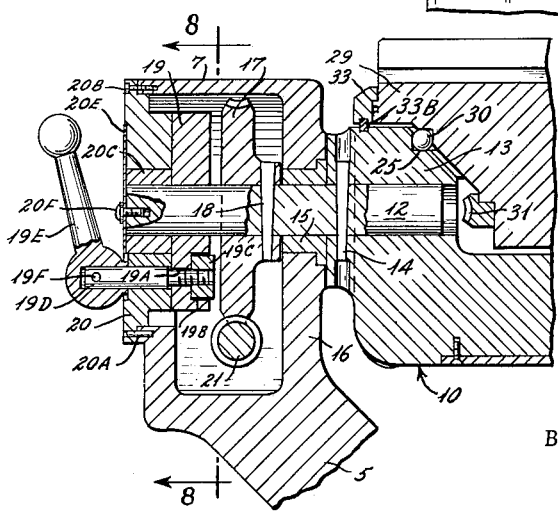

Other and further objects will be apparent as the description proceeds and upon reference to the accompanying drawings wherein:

FIG. 1 is a front elevation of the tiltable rotary table of the present invention showing the sub-base for mounting directly on the longitudinally movable work supporting table of a machine tool such as a jig borer and showing the worm and gear manual operation for obtaining the ninety degrees of tilt with the limits of tilt shown in full lines and dotted lines;

FIG. 2, a plan view of the tiltable rotary table with parts in section to illustrate the motor and manual operating mechanism for the worm for rotating the worm gear on the rotary table and showing the protractor on the rotary table and the indicating dial and vernier to obtain approximate positioning;

FIG. 3, a section taken substantially on broken line 3—3 of FIG. 2 and showing the yoke structure of the sub-base providing bearing housing supporting struts on which the base of the rotary table is mounted and showing the lock for retaining the rotary table in fixed position relative to the base and also showing the mounting of the stators, rotors and resolvers of the Inductosyn structure;

FIG. 4, a fragmentary vertical section taken substantially on line 4—4 of FIG. 2 showing a motor and gear reduction housing for driving the worm shaft for rotating the rotary table;

FIG. 5, a fragmentary rear elevation of a fragment of the rotary table showing the rear bearing housing and the supporting strut enclosing the tilt indicating Inductosyn and rotor showing the gear reduction housing for the rotation of the rotary table with the motor shown in phantom lines;

FIG. 6, a fragmentary section taken substantially on line 6—6 of FIG. 3 illustrating the worm and gear drive to tilt the rotary table with its supporting base and showing the clamping brake structure for retaining the base in fixed position;

FIG. 7, a front elevation of the simplified numerical manual control for predetermining the angular adjustments of the tilt and the rotation of the rotary table;

FIG. 8, a section on the line 8—8 of FIG. 6;

FIG. 9, a schematic diagram illustrating the principle of operation of Inductosyn; and, FIG. 10, a wiring diagram illustrating the manner in which one axis of rotation of the rotary table is controlled by the rotation of numerical control elements.

Briefly, the present invention comprises a tiltable rotary table for mounting on the usual longitudinally movable work support of a jig borer or other machine tool and includes a yoke-shaped sub-base having the strut members thereof extending upwardly providing bearing supporting housing for aligned stub shafts fixed to diametrically opposed portions of the base of a rotary table with the rotary table mounted on its base for rotation about an axis intersecting the axis of said stub shafts. A manually rotated worm shaft operates a worm and gear providing for the base about the axis of said stub shafts and another worm and gear arrangement either manually or motor operated is provided for rotating the rotary table relative to the base. Suitable dials are provided on the worm shafts to indicate small angular rotation of less than a degree while the rotary table and the sub-base carry protractors to visually indicate the rotation and tilt respectively providing for direct observation. To provide for accuracy in reading of the angles to within two seconds of arc a Farrand simplified manual numerical control cooperates with two Inductosyn stator, rotor and resolver systems to indicate the precise extent of tilt and rotation with cooperating meters showing when the exact adjustment as set on the manual numerical control has been obtained.

Referring more particularly to the drawings a sub-base 1, provided with a series of attaching bolt receiving slots 2 for securement to a work supporting table of a machine tool, has a horizontally extending web portion 3 and a vertical wall 4 integrally connected to upwardly extending struts 5 and 6 forming a yoke having bearing housings 7 and 8 at their upper ends with the bearing housing 7 communicating with a worm shaft receiving housing 9 also supported on the strut 5.

Positioned within the yoke between the bearing housings 7 and 8 is the base 10 of the rotary table 11. At the front edge of the base 10 a stub shaft 12 is fixedly secured in a bore in the peripheral wall 13 of the base by a tapered pin 14 and the stub shaft passes through an accurately fitted bushing 15 in the bushing supporting wall 16 of the strut 5 and within the hollow bearing housing 7 a worm gear 17 is fixed to the stub shaft 12 by a tapered pin 18 while fixed to the stub shaft 12 is a brake disc 19 suitably welded to the stub shaft. The brake disc has an arcuate slot 19A of approximately 90 degrees of arc passing completely through the disc 19 with the disc also being provided with a communicating and large brake shoe receiving slot 19B which receives an arcuate shaped brake shoe 19C which is moved toward the bottom of the slot 19B causing a reaction on the disc 19 against a closure plate 20 closing the opening in the bearing housing 7 which plate 20 is positioned in accurate location by a dowell pin 20A and retained in fixed position by machine screws 20B. The closure plate 20 carries a bushing 20C surrounding the stub shaft 12 providing for additional support thereof and such closure plate 20 also has protractor indicia 20D which cooperates with a pointer 20E fixed to the free end of stub shaft 12 by a cap screw 20F with the pointer 20E being received within a recess in the outer face of the closure plate 20 and cooperating with the protractor indicia 20D. The brake shoe 19C is threaded onto the threaded reduced end of a stepped shaft 19D rotatably and slidably mounted in a bore in the closure plate 20. On the outer end of stepped shaft 19D an operating handle 19E is fixed by a tapered pin 19F, whereby rotation of the handle 19E causes the threaded end to draw the brake shoe 19C against the bottom of the slot 19B thereby fixing the position of shaft 12 and of the base 10 of the rotary table. Cooperating with the worm gear 17 is a worm 21 fixed on a shaft 21A suitably mounted in anti-friction thrust bearings and manually rotatable by a hand wheel 21B which is selectively connectable to a setting dial 21C the setting of which is controlled by a knob 21D which setting dial 21C cooperates with a vernier 21E to indicate fractions of degrees of tilt while the degrees are read by the pointer 20E on the protractor 20D.

Projecting into the bearing housing 8 is a stub shaft 22 fixed by means of a tapered pin 22A in a radiating bore in rotary table base 10 diametrically opposite the stub shaft 12 and in axial alignment therewith, the stub shaft being rotatably mounted in a bushing 22B fixed in the adjacent wall 22C in the bearing housing 8.

Fixed by means of socket head screws 23A to the wall 22C is an Inductosyn stator 23 which cooperates with an Inductosyn rotor 23B fixed to the large diameter flange 22D of stub shaft 22 by means of socket head screws 23C with an intermediate diameter section 22E of the shaft 22 lying within and centering the rotor 23B with such intermediate diameter end section being connected by an Oldham coupling 22F connected to the rotary element of an Inductosyn resolver 24 which Inductosyn resolver is adjustably mounted in a resolver housing 24A receiving the stationary portion of the Inductosyn resolver 24 and retaining such stationary portion of the resolver in adjusted position by a cone pointed set screw 24B adjustable into a groove 24C in the stationary portion of the resolver. The resolver housing 24A is fixed to a cover plate 24D to which the resolver housing is secured by screws 24E and such cover plate 24D is secured to the bearing housing 8 by suitable screws 24F. The Inductosyn stator is provided with a cable 23L leading therefrom to the manual numerical control. Second lead 23BL also extends from the stator but is connected to the stationary portion of a rotary transformer in the stator which cooperates with another element of the rotary transformer in the rotor 23B whereby the alternating current energizing the system is conveyed to the coils of the rotor without requiring slip rings. The resolver 24 is also provided with a lead cable 24L for carrying the signals. The cover plate 24D is provided with a central opening to permit insertion of the resolver and access to the resolver which opening is closed by a plug button 24G.

The base 10 having upstanding peripheral wall 13 has the upper edge of such wall substantially planar with the inner portion thereof extending downwardly in a concave cone-shape and provided with a ball bearing receiving groove 25 receiving anti-friction balls for supporting the rotary table 11. The base 10 includes a web portion 26 merging with an integral hub 27 projecting upwardly therefrom in the direction of the upstanding peripheral wall 13. Radiating webs 26A extend between hub 27 and web 26 increasing the rigidity thereof. A flanged bushing 27A within hub 27 is fixed by its flange to the upper end of the hub by socket cap screws 27B which bushing rotatably supports a hollow flanged shaft 28 having a tapered bore 28A from one end communicating with a counter bore 28B at the other end which counter bore receives part of an Oldham coupling 28X.

The Oldham coupling 28X is secured to the hollow shaft by means of a tapered plug which is frictionally retained in the lower end of the hollow taper of the hollow shaft thereby providing for easy angular adjustment and easy mounting and removal for servicing.

Mounted on the flange 28C of the hollow shaft 28 is the rotary table 11 which is secured to the flange 28C by socket head screws 28D with the angular position between the shaft 28 and rotary table being accurately determined by a positioning dowell pin 28E which screws and pin extend into aligned apertures in the flange and in the rotary table. The rotary table extends radially outwardly to overlap the upstanding peripheral wall 13 of the base 10 and has a substantially horizontal peripheral flange portion 29 overlying the top of the peripheral wall 13. The peripheral flange portion 29 merges with a downwardly sloping conical surface having a ball receiving groove 30 which cooperates with the ball receiving groove 25 and the balls in the grooves to support the edge portion of the rotary table with the axis being accurately determined by the bushing 27A, the rotary table being provided with a downwardly extending skirt 30A having machined cylindrical inner and outer surfaces 30B and 30C with a shoulder 30D formed at the upper end of cylindrical surface 30C. A ring type worm gear 31 is accurately mounted in abutting relation to shoulder 30D on the skirt 30A appreciably above the bottom edge of the skirt 30A by means of socket head screws 31A with the position being accurately determined by a positioning dowell pin 31B.

To fix the rotary table in position a pair of clamping jaws 32 and 32A are positioned in suitable guideways in a clamping jaw receiving recess in the base 10. Access to the jaws in the recess is obtained through an opening in the lower surface and such jaws are retained in position by the stepped shaft 32B and guided by the sides of the recess which prevent pivotal movement of the jaws about the stepped shaft.

It will be apparent that the inner jaw 32A has a convex cylindrical clamping surface portion while the outer jaw 32 has a concave cylindrical clamping surface to cooperate with the outer cylindrical surfaces of the skirt 30B of the rotary table in non-influencing clamping relation by means of a stepped shaft 32B rotatably and slidably supported in a bushing 32C removably secured in a radial stepped bore in the upstanding wall 13 of the base 10. The shaft 32B has its inner small diameter end 32D rotatably and slidably supported in a radial bore in a web 26A of the base 10 with the next larger diameter portion of the shaft 32E of the shaft 32B being threadedly received in the jaw 32A while a shoulder 32F of the shaft 32B engages a shoulder on the jaw 32 whereby rotation of the shaft will cause relative approach and withdrawal movements of the jaws and thereby produce clamping or unclamping action for retaining the rotary table in fixed position or permitting rotation thereof. The shaft 32B is rotated by a handle 32G having a tapered bore which permits adjustable mounting on the tapered outer end of shaft 32B and is secured in adjusted position by a cap screw 32H threaded into a bore in the shaft 32B in such position that a fraction of a rotation of the handle 32G will result in clamping or unclamping action of the jaws 32 and 32A.

Mounted on the outer periphery of the rotary table 11 is a protractor ring 33 secured in a rabbet groove against axial and rotary movement by half dog set screws 33A with the protractor cooperating with the upper peripheral wall and a slidable sealing gasket 33B to prevent dirt from getting into the mechanism. The protractor 33 is read within an accuracy of one degree by cooperation with an index finger 33C having a mark 33D suitably positioned on the base 10. The rotation of the table is accomplished by means of a worm 34 cooperating with the ring worm gear 31 and being rotated by a worm shaft 34A mounted in anti-friction thrust bearings 34B and anti-friction bearings 34C with the shaft projecting beyond such anti-friction bearing toward the front of the machine through a cover plate 34D.

The front end of worm shaft 34A has a hubbed disc 34E secured thereto by a tapered pin running through the hub thereof. The hub has external threads on which an internally threaded clamping disc 34F is mounted and between such discs 34E and 34F is an externally knurled hand wheel 34G which is non-rotatably connected to the disc 34E by a dowell pin 34H fixed to the hubbed disc 34E and projecting forwardly therefrom and slidably received in an aligned bore through the hand wheel disc 34G. A setting dial 34I of ring-shape is freely rotatably mounted in registering peripheral rabbet grooves in the outer periphery of the discs 34E and 34G, it being observed that an external rib on the setting dial 34I is also knurled to provide for relative adjustment between such setting dial and the discs 34E and 34G, the adjusted relation being maintained by the clamping action of clamping disc 34F against the web of the hand wheel 34G. A pair of springs 34J are provided in diametrically opposed relation in bores in the dial 34I with such springs pressing against friction elements engageable with the hand wheel 34G thereby maintaining a frictional engagement with the hand wheel dial to prevent unintentional relative movement of the dial with respect to the hand wheel and the worm shaft. On the cover plate 34D a vernier scale is provided to cooperate with the indicia on the setting dial 34I.

It will be apparent that the position of the rotary table can be adjusted by rotation of the hand wheel 34G and the setting dial 34I can be adjusted so that its zero index corresponds with the degree markings on the protractor 33 thereby providing a readily accessible means for obtaining minute adjustments of the rotary table as well as an approximately accurate indication of the rotated position thereof.

The worm shaft 34A may also be rotated by means of a motor 35 having a pinion 35A fixed on the motor shaft and cooperating with a gear 35B fixed on the worm shaft 34A with a suitable housing 35C covering such gearing with the housing having an enlarged opening 35D through which the pinion 35A may pass permitting attachment of the motor 35 without complete disassembly of the parts. The motor 35 is controlled by a suitable switch 35F at a convenient location for forward and reverse rotation through suitable leads 35E which permits observation of the rotation of the rotary table with respect to the index finger 33C.

To maintain the rotary table 11 in operative position with respect to the base 10 and prevent axial movement thereof a flanged collar bearing holder 36 is concentrically mounted on the counter bore end of hollow shaft 28 by socket cap screws 36A with the flange of bearing holder 36 engaging a lower race 36B of an anti-friction thrust bearing having cooperating ball bearings and an upper race 36C to maintain a reaction between the hollow shaft 28 and the rotary table and the bottom surface of the bushing 27A. An Inductosyn rotor 37 is mounted on the flange on the bearing supported collar 36 by a plurality of cap screws 37A and a stator 38 is fixed to the rotary table base 10 by means of cap screws 38A threaded into threaded apertures in base 10, it being apparent that the lower portion of the base has a recess providing sufficient clearance to accommodate the Inductosyn rotor 37, stator 38, and resolver 39. The resolver 39 is mounted on a removable closure plate 39A to which a resolver receiving housing 39B is secured by suitable bolts with the stationary element of the resolver being held in adjusted position by a set screw 39C, the closure plate 39A being provided with a central opening closed by a button 39D providing access to the resolver 39. A cable 38L extends from the stator 38 and is connected to the windings thereof while another cable 37L provides leads from a rotary transformer element in the stator 38 which cooperates with a rotary transformer in the rotor 37 to produce the necessary alternating current action in the rotor to accomplish the desired control of the signals. A lead 39L from the resolver 39 also provides for carrying signals to and from the resolver.

Upon reference to FIG. 7 the simplified manual numerical control includes an upper panel 40 having seven adjustable rheostats or other numerical control elements 43 thereon and a meter to indicate when the adjustment is obtained. Said upper panel is connected through the lead cables 38L, 37L and 39L to the stator 38, rotor 37 and resolver 39, respectively, of the rotary table. In use the desired angle is predetermined and the setting is made by adjusting the first three elements 43 from the left to indicate the azimuth angle of the rotary table setting desired. The fourth and fifth elements 43 are used to indicate the number of minutes and the sixth and seventh elements 43 to indicate the number of seconds. The adjustment desired is predetermined by the operator and the motor 35 is operated through its switch 35F until the needle of the meter on panel 40 is approximately at the zero point indicating a null and thereby indicating that the desired angle has been obtained. The final adjustment is made by the operator by rotating the hand wheel 34G to the correct reading of the meter on the panel 40. The setting dial 34I for direct observation may then be adjusted in a definite position so that manual adjustments can be made with approximate accuracy from the predetermined setting. However, greater accuracy is obtained by setting the elements 43 on the panel 40 and moving the rotary table until the null is obtained as indicated by the meter on panel 40.

A similar predetermined adjustment setting is accomplished in a similar manner for the tilt of the table by a second panel 41. The second panel contains six numerical control elements 43 and a meter with cable leads 23L to the stator 23, cable lead 23BL to the rotor 23B, and cable lead 24L to the resolver 24. The elements 43 are set on the panel 41 to obtain the degree setting in the first two elements on the left, the minutes setting in the third and fourth elements 43, and the seconds setting in the fifth and sixth elements with the adjustment being made in the manner previously described so that the meter on the panel 41 leaves a null when the desired setting is obtained.

The operating principle of the rotary form of Inductosyn has a similarity to an electrical resolver, selsyn or synchro. In all of these devices the output signal as a function of rotation angle is obtained by the inductive coupling between stationary and moving conductors. The Inductosyn consists of two stationary crossed coils or stator coils and a third coil or rotor mounted on a rotating shaft. When the rotary coil is turned, the induced voltage in one stator coil follows a sine curve and the voltage induced in the other stator coil follows a cosine curve.

FIG. 9 illustrates diagrammatically how one of these devices can be used to reproduce an angle in response to an input of analog voltages representing the sine and cosine of the required angle. When the output voltage of the receiver rotor is at a null, its angular position corresponds to the complement of the angle whose sine and cosine are developed in the control.

It is significant that the location of the null is dependent only upon the ratio of the since and the cosine of the required angle. This ratio is obtained as the ratio of the resistances of the sine and cosine windings of an input potentiometer; thus angular position can be achieved in terms of resistance ratios.

It is noted that although stator 23 and rotor 23B are illustrated in FIG. 9, stator 38 and rotor 37 are substantially identical and operate in the same manner.

With reference to FIG. 10 a block diagram is shown for producing an angle in response to a control input. In the use of this system it is necessary only to provide a pair of voltages proportional to the sine and cosine of the required angle and apply these to the stator windings of the Inductosyn. This is accomplished by manually setting a numerical control element such as a rheostat or adjustable voltage member 43 to a desired position. Only one element 43 is shown in FIG. 10 connected to the resolver 24 although it would be obvious that as many elements as required could be connected to such resolver. The resolver transmits the voltage signal through a transformer coupling 44 to the windings of stator 23. An error signal is induced in the rotor 23B and such signal is applied to a servo-drive 45 which will then reproduce the required mechanical angle.

The Inductosyn apparatus is a commercially available product of Farrand Controls, Inc., 99 Wall Street, Valhalla, New York, and a detailed description thereof can be found in the "Inductosyn Principles and Operations," publication ER No. 312, Sup. 1, September 1960, of the corporation and therefore a detailed description is omitted to simplify the description in the present application.

To limit the movement of the base 10 to the phantom line vertical position in one direction a rest button 42 is provided on web 42 to engage the bottom of peripheral wall 13 of the base. Two rest buttons 42A and 42A are provided on the top of web 4 to engage the bottom surface of peripheral wall 13 of base 10 to limit the tilt in the other direction to the horizontal position shown in full lines in FIG. 1.

It will thus be seen that applicants have provided an accurately adjustable tiltable rotary table and that various changes can be made within the scope of the valid interpretation of the claims.

What is claimed is:

1. A tilting rotary table comprising a sub-base, a base pivotally mounted on said sub-base, a rotary table rotatably mounted on said base, means to adjust the angularity between said sub-base and said base, means to retain the base and sub-base in adjusted angular position, means to rotate said rotary table relative to said base, means to retain said rotary table in adjusted position, an Inductosyn rotor mounted in axial alignment with the pivotal axis between said base and said sub-base and being fixed relative to said base, a cooperating stator mounted in fixed relation on said sub-base and in axial alignment with the pivotal axis between said base and said sub-base and in cooperative relation with the rotor on said base, a resolver operatively connected to said base and to said sub-base and cooperating with the cooperating stator and rotor on said sub-base and said base, a rotor mounted on said rotary table in axial alignment with the axis of rotation thereof and fixed relative to said rotary table, a cooperating stator mounted on said base in axial alignment with the axis of rotation of said rotary table and fixedly mounted on said base, a resolver operatively connected to said rotary table and to said base, and cooperating with the stator and rotor on said base and said rotary table, a first Farrand simplified manual numerical control operatively connected to the Inductosyn, rotor, stator and resolver between said sub-base and base, a second Farrand simplified manual numerical control operatively connected to the rotor, stator and resolver between said base and said rotary table whereby the angular relation between said sub-base and base, and between said rotary table and base can be accurately predetermined.

2. A tiltable rotary table comprising a sub-base, a base mounted for pivotal movement from a position substantially transverse to said sub-base to a position substantially parallel therewith, a rotary table rotatably mounted on said base for rotation about an axis transverse to the pivotal axis of said base, means to tilt said base relative to said sub-base and to indicate the angular position of said base relative to said sub-base, and means to rotate said rotary table relative to said base and to indicate the angular position of said rotary table said means to indicate the angular position of said base relative to said sub-base including an Inductosyn rotor mounted on said base and an Inductosyn stator mounted on said sub-base in cooperative relation and means to indicate when the Inductosyn stator and the Inductosyn rotor of said base and sub-base are in predetermined desired angular relation, and a second Inductosyn rotor mounted for rotation with said rotary table and a second Inductosyn stator mounted on said base in cooperative relation therewith to indicate the angular relation between said rotary table and said base, and means to indicate when the Inductosyn stator and Inductosyn rotor on said base and rotary table are in predetermined desired angular relation.

3. A tiltable rotary table comprising a sub-base having upstanding bearing supporting strut members at opposed edges thereof, a base pivotally mounted on said strut members of said sub-base for movement about an axis through said strut members, a circular work supporting table rotatably mounted on said base for rotation about an axis intersecting said axis through said strut members, manual and power means to rotate said rotary table, manual means to pivot said base, direct reading scales on said base and rotary table and on said sub-base and base to indicate the angular relation of the parts, a worm gear fixed to said base for movement with said base about said axis through said strut members, a worm rotatably mounted on said sub-base and meshing with said worm gear on said base to tilt said base relative to said sub-base, a worm gear on said circular work supporting rotary table, a worm rotatably mounted on said base cooperating with said worm gear on said rotary table to rotate said rotary table upon rotation of said worm on said base, an Inductosyn stator fixed on said sub-base, and Inductosyn rotor fixed on said base in coupled relation to said stator on said sub-base whereby pivotal movement of said base relative to said sub-base will change the angular relation of said stator and rotor, as Inductosyn rotor fixed to said rotary table, a stator fixed to said base and cooperating with said rotor fixed to said rotary table to indicate the relative angular positions thereof, and a manual numerical control manually adjustable to predetermine the desired positions of said rotors and stators and meter means to indicate when the desired predetermined positions of the rotors, with respect to the stators, are obtained.

4. A tiltable rotary table comprising a sub-base having means for attachment to a longitudinally movable table of a machine tool, diverging struts projecting from said sub-base, bearing receiving housings on the outer ends of said struts, a base positioned between said bearing housings, diametrically opposed pivot means between said bearing housings and said base, means to pivot said base to vary the angular position of said base with respect to said sub-base whereby work may be positioned in angular relation to the machine tool, said base being provided with an upstanding hub and a peripheral wall, a bearing bushing mounted in said upstanding hub, a shaft rotatably mounted in said bearing bushing, a rotary table surrounding said shaft and fixed thereto, said rotary table having a downwardly extending skirt positioned inwardly of said upstanding peripheral wall of said base, said rotary table and said base having adjacent conical surfaces therebetween with registering cooperating ball receiving grooves, balls in said grooves supporting said rotary table, said bearing bushing accurately determining the center of rotation, a flanged collar positioned at the lower end of said shaft, a thrust anti-friction bearing having one race in engagement with said bearing bushing and the other race in engagement with the flange of said collar, means securing said collar to said shaft, the skirt of said rotary table having cylindrical inner and outer surfaces, said base having a recess for receiving clamping jaws, a stepped shaft extending through the peripheral wall of said base through said clamping jaw receiving recess and into a portion of said base adjacent said hub, said stepped shaft having a section of intermediate diameter provided with threads, a pair of L-shaped clamping jaws positioned in said clamping jaw receiving recess with the clamping surfaces cooperating with the cylindrical inner and outer surfaces of said skirt, one jaw having a threaded bore receiving the threaded section of said stepped shaft, the other jaw having a smooth bore receiving a portion of said stepped shaft and having a shoulder engaging a shoulder of said stepped shaft whereby rotation of said stepped shaft will cause said clamping jaws to move toward and away from one another, and handle means outside of said base for rotating said stepped shaft.

5. The invention according to claim 4 in which a worm gear is mounted on the cylindrical outer surface of the skirt of said rotary table, a worm shaft having a worm gear thereon mounted with said worm gear in tangential operative relation to said worm gear on said rotary table, thrust anti-friction bearings mounting said worm shaft against axial movement, a motor and gear arrangement for driving said worm shaft, a hand wheel and an indicating dial mounted on said worm shaft for manually rotating said worm shaft whereby a rapid and minute adjustment can be obtained for the rotary table.

6. The invention according to claim 4 in which said base is provided with an Inductosyn receiving recess in the opposite side thereof from the rotary table, a rotor positioned in said recess and fixedly mounted on said flanged collar, said rotor providing coils for the passage of electrical alternating current, a stator positioned within said Inductosyn receiving recess and fixedly mounted on said base closely adjacent said rotor, said stator having windings for 360 poles, a first lead from said stator windings, a rotary transformer in said rotor and in said stator, a second lead connected to said rotary transformer in said stator and extending from said stator for carrying alternating current to and from said rotor, and cooperating adjustment means connected to said leads to indicate when a precise position has been obtained therebetween.

7. The invention according to claim 6 in which a resolver is mounted in operative relation to said base and said rotary table to select the approximate angle prior to the precise angle determination by said rotor and stator.

8. A tiltable rotary table comprising a sub-base having means for attachment to a longitudinally movable table of a machine tool, said sub-base having diverging struts connected by a wall, said struts being provided with bearing receiving housings at their outer ends, a generally circular base positioned between said bearing housings, a stub shaft projecting from diametrically opposed positions of said base into said bearing housings with said stub shafts being fixed to said base, means to rotate one of said stub shafts to vary the angular position of said base with respect to said sub-base whereby work may be positioned in angular relation to the machine tool, said base being provided with an upstanding hub and an upstanding peripheral wall, a flanged bearing bushing mounted in said hollow upstanding hub and having its flange engaging the outer end of said hub, a hollow shaft having a flange intermediate its ends rotatably mounted in said flanged bearing bushing, a rotary table surrounding said hollow shaft and fixed to the flange thereof, said rotary table having a downwardly extending skirt positioned inwardly of said upstanding peripheral wall, said downwardly extending skirt of said rotary table and said upstanding peripheral wall of said base having adjacent conical surfaces therebetween and said conical surfaces being provided with registering cooperating ball receiving grooves, balls in said grooves supporting said rotary table, said flanged bearing bushing serving accurately determining the center of rotation, a flanged collar positioned at the lower end of said hollow shaft, a thrust anti-friction bearing having one race in engagement with said bearing bushing and the other race in engagement with the flange of said collar, means to adjustably secure said collar to said hollow flanged shaft whereby the desired axial adjustment of the thrust bearing can be obtained by said securing means.

9. A tilting rotary table comprising a sub-base, a base pivotally mounted on said sub-base, a table rotatably mounted on said base, means for rotating said base relative to said sub-base, means including cooperating electrically controlled elements for indicating the position of said base relative to said sub-base, certain of said elements being mounted on said sub-base and certain of said elements being carried on said base in axial alignment with said pivoted mounting, motor means for rotating said table relative to said base, means regulating the operation of said motor means including cooperating electrically controlled elements, certain of said elements being mounted on said base and certain elements being carried on said table about the axis of rotation thereof, and panel means controlling said electrically controlled elements whereby the angular relation between said sub-base and said base and between said base and said table can be accurately predetermined.

References Cited by the Examiner

UNITED STATES PATENTS

| | | | |
|---|---|---|---|
| 1,414,970 | 5/1922 | Nelson | 269—71 X |
| 2,146,906 | 2/1939 | Moller | 77—63 X |
| 2,295,022 | 9/1942 | Yanchek | 77—64 |
| 2,445,016 | 7/1948 | Bentley | 263—73 X |
| 2,736,244 | 2/1956 | Olson. | |
| 2,771,821 | 11/1956 | Beusch. | |
| 2,848,711 | 8/1958 | Rhodes | 340—198 |
| 3,022,066 | 2/1962 | Benes | 269—73 X |
| 3,041,587 | 6/1962 | Rasquin et al. | 340—198 |

OTHER REFERENCES

Publication: "Omnidex" Brochure, Superior Machine and Engineering Company, 1930 Ferry Park, Detroit 8, Michigan, 4 pages.

WILLIAM W. DYER, Jr., *Primary Examiner.*